(12) United States Patent
Rush, III et al.

(10) Patent No.: US 11,047,569 B2
(45) Date of Patent: Jun. 29, 2021

(54) GAS-FIRED INFRARED BURNER

(71) Applicant: Solaronics, Inc., Auburn Hills, MI (US)

(72) Inventors: Richard Rush, III, Auburn Hills, MI (US); Thomas A. Martelle, Rochester Hills, MI (US)

(73) Assignee: Solaronics, Inc., Auburn Hills, MI (US)

( * ) Notice: Subject to any disclaimer, the term of this patent is extended or adjusted under 35 U.S.C. 154(b) by 117 days.

(21) Appl. No.: 16/454,509

(22) Filed: Jun. 27, 2019

(65) Prior Publication Data

US 2020/0408403 A1 Dec. 31, 2020

(51) Int. Cl.
*F23D 14/14* (2006.01)
*F24C 3/10* (2006.01)
*F24C 3/06* (2006.01)

(52) U.S. Cl.
CPC .............. *F23D 14/14* (2013.01); *F24C 3/06* (2013.01); *F24C 3/10* (2013.01); *F23D 2203/103* (2013.01); *F23D 2212/20* (2013.01); *F23D 2900/14001* (2013.01); *F23D 2900/1412* (2013.01)

(58) Field of Classification Search
CPC .............. F23D 14/14; F23D 2203/103; F23D 2212/20; F23D 2900/14001; F24C 3/06; F24C 3/10
USPC .................. 126/39 J; 431/329, 347, 328, 326
See application file for complete search history.

(56) References Cited

U.S. PATENT DOCUMENTS

| | | | |
|---|---|---|---|
| 3,040,805 A * | 6/1962 | Lambert | A21B 2/00 431/329 |
| 3,107,720 A * | 10/1963 | Swinderen | F23C 99/00 431/329 |
| 3,403,965 A | 10/1968 | Dreisziger | |
| 3,463,139 A | 8/1969 | Hayashi et al. | |
| 3,635,644 A | 1/1972 | Reid, Jr. | |
| 5,186,620 A | 2/1993 | Hollingshead | |
| 5,439,372 A * | 8/1995 | Duret | F23D 14/02 431/2 |
| 5,520,536 A * | 5/1996 | Rodgers | F23D 14/02 126/116 R |
| 6,364,657 B1 | 4/2002 | O'Donnell | |
| 6,659,765 B1 | 12/2003 | Sen-Yu | |
| 6,896,512 B2 * | 5/2005 | Rattner | F23D 14/16 126/91 R |
| 8,919,336 B2 | 12/2014 | von Herrmann et al. | |
| 2006/0003279 A1 * | 1/2006 | Best | F23D 14/14 431/328 |
| 2008/0227044 A1 * | 9/2008 | Cookson | F23D 14/16 431/328 |

(Continued)

*Primary Examiner* — Avinash A Savani
(74) *Attorney, Agent, or Firm* — Young Basile Hanlon & MacFarlane, P.C.

(57) ABSTRACT

A gas-fired, powered infrared burner unit comprising a perforate distribution plate configured as a tray and a porous foam metal burner element carried in the tray, the combination overlying the open top of a plenum box and sealingly fastened to an edge flange of said box by a retainer having a surrounding flange fastened to the plenum box flange by welding, staking or other means so as to eliminate the need for a gasket. The foam metal medium is constructed of a foam metal alloy to have a pore size of 1000 micros±5%, and produce, along with the perforations in the distribution tray, a port loading of between about 850 and 1,000 BTU/in$^2$.

10 Claims, 5 Drawing Sheets

(56) References Cited

U.S. PATENT DOCUMENTS

| | | | |
|---|---|---|---|
| 2010/0077731 A1* | 4/2010 | Jeong | F01N 3/0256 |
| | | | 60/286 |
| 2014/0248570 A1* | 9/2014 | Zhang | F24C 3/02 |
| | | | 431/263 |
| 2015/0253005 A1* | 9/2015 | Sutherland | F23C 99/006 |
| | | | 431/328 |
| 2017/0122555 A1* | 5/2017 | Owens | F23D 14/145 |

* cited by examiner

GAS-FIRED INFRARED BURNER

FIELD OF THE INVENTION

This invention relates to gas-fired infrared burners and more particularly to the design of a powered, gas-fired infrared burner using a porous foam metal medium held by a slotted distribution tray to produce a specific port loading and, when combined with a properly designed plenum box, eliminates the need for conventional gaskets.

BACKGROUND OF THE DISCLOSURE

Infrared radiant burners typically comprise a plenum body, a tube or other device for inputting a fuel air mixture, and one or more ceramic panels or plates acting as radiators. Gaskets of high temperature felt or other materials are used in the interfaces between elements to prevent leakage of the fuel-air mixture introduced under pressure.

BRIEF SUMMARY OF THE DISCLOSURE

The present disclosure illustrates and describes a gas-fired infrared burner unit suitable for use in cooking devices as well as in other applications benefiting from clean and efficient heat production using available fuels such a propane, butane and natural gas.

The burner unit herein described uses a porous foam metal radiator medium in combination with a perforate distribution tray to produce a port loading in a range of about 850 to 1,000 BTU/in$^2$. This combination can be assembled to a flanged plenum box using a flanged retainer member that holds the bottom of the distribution tray against the plenum box flange so as to eliminate the need for conventional gaskets that typically deteriorate over time and render the burner containing them essentially useless.

In the illustrated embodiment hereinafter described, the distribution tray, so called because it comprises a flat perforate plate sized to cover the entire plenum opening and has a full-edge lip, and a foam metal radiator medium disposed in the tray, the radiator medium being manufactured to produce a uniform array of open cells or "pores" with a dimension of approximately 1,000 microns plus or minus 5%. The size and distribution of the slots in the distribution tray are sized to distribute the fuel air mixture introduced under pressure into the plenum box uniformly and through the porous foam metal medium without creating undesirable noise when the burner is in operation and to reduce the tendencies for flame lift off and/or cracking of the medium panel. The retainer member has a bezel that captures the top edge of a lip on the tray to hold the tray and the porous medium to the plenum box when welded or otherwise attached.

BRIEF DESCRIPTION OF THE DRAWINGS

Additional features and advantages of the invention will be come apparent from a reading of the following description of an illustrative embodiment producing approximately 34,000 BTUs, which description is to be taken with the accompanying drawing figures of which.

DETAILED DESCRIPTION OF THE ILLUSTRATIVE EMBODIMENT

Figure 1:
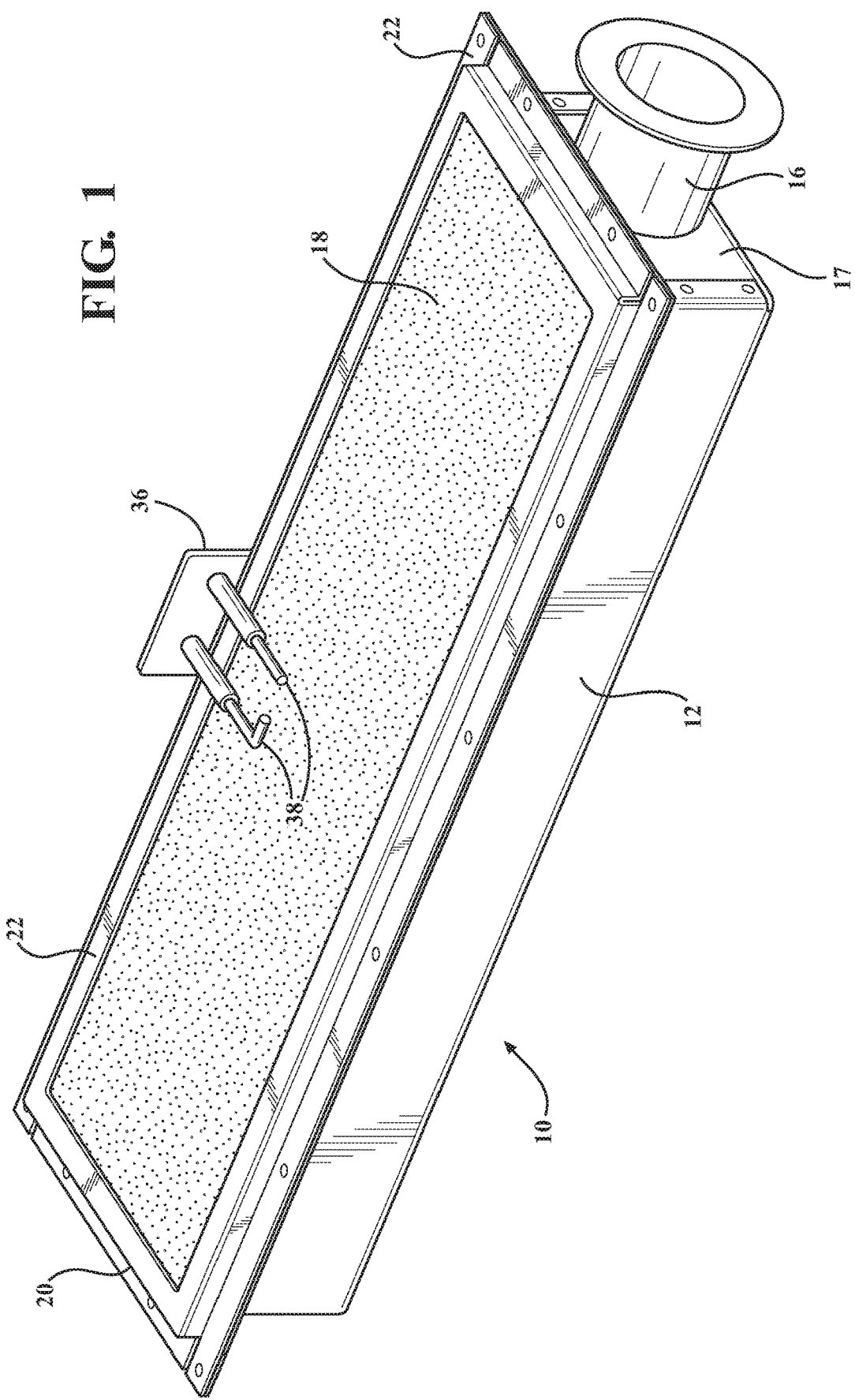
FIG. 1 is a perspective view of an assembled burner.
Figure 2:
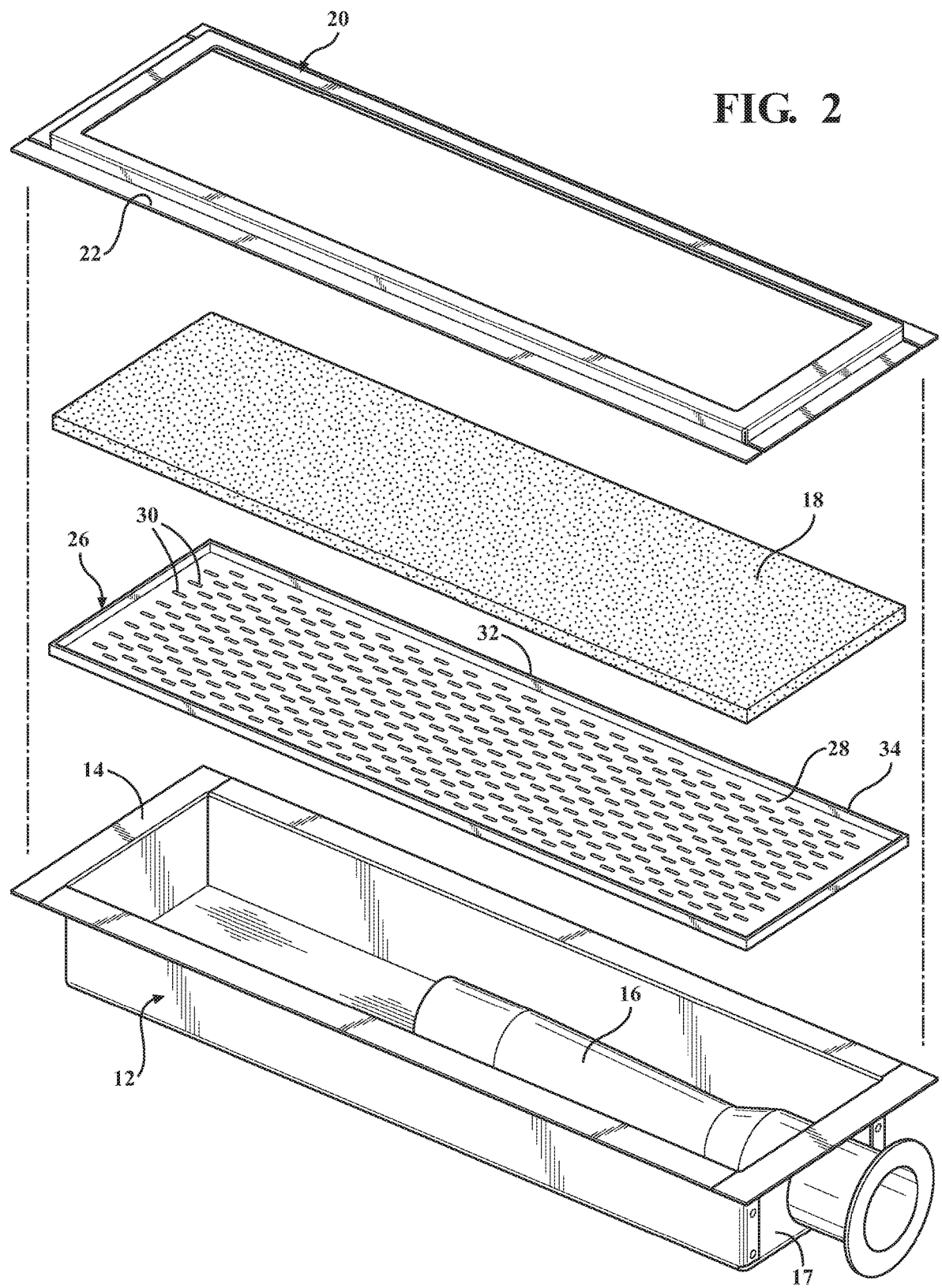
FIG. 2 is an exploded view of the burner of FIG. 1.
Figure 3:
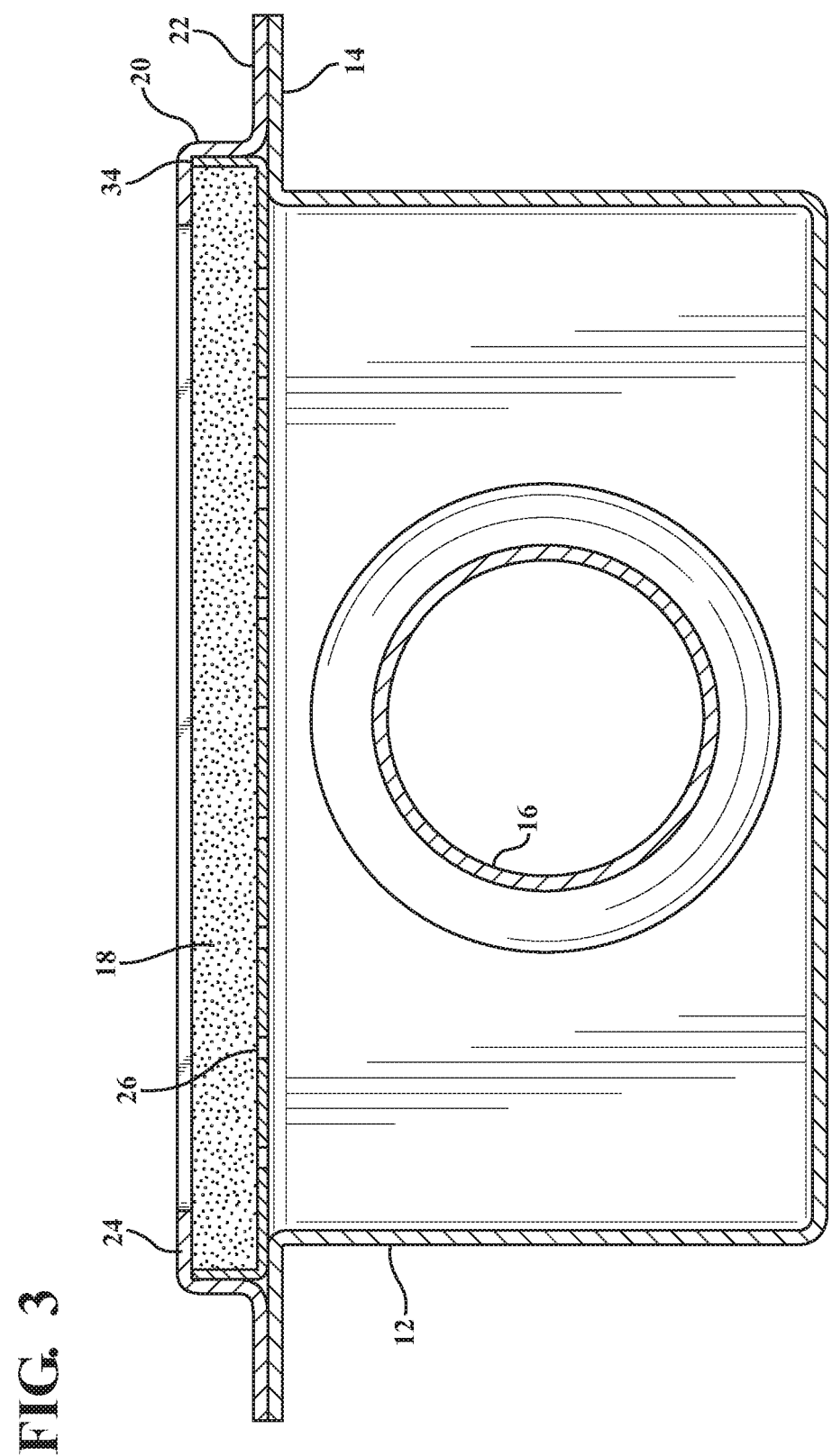
FIG. 3 is an end-on, sectional view of the FIG. 1 burner.

Referring now to FIGS. 1-3 there is shown a powered, gas-fired infrared burner 10 comprising a four-sided rectangular sheet metal plenum box 12 having a rectangular top opening bounded by a flat four-sided flange 14, the upper surface of which fully surrounds the opening and lies in a single plane. The plenum box 12 further comprises a fuel/air inlet tube 16 extending through and in close, air-tight fit with an opening in the end panel 17 of the plenum box. As shown in FIG. 2 the tube 16 extends approximately to the center of the plenum box interior volume. The tube 16 may be straight sided where the fuel/air mixture is introduced as a pre-mix. Alternatively, the tube 16 may be provided with multiple inlets, one each for air and fuel, in which case the tube 16 is configured to include a Venturi neck area, as shown in FIG. 2, to aid in mixing the fuel and air on its way into the plenum box 12.

The burner unit 10 further comprises a flat panel porous, foam metal medium 18 having a rectangular configuration dimensioned to correspond to the top opening of the plenum box 12. The panel is manufactured from a foam metal which may be an alloy of nickel, chromium and aluminum with a pore size on the order of 1,000 microns plus or minus 5% uniformly distributed throughout the material of the medium. The pores or cells are open to one another to allow for flow of the fuel/air mixture through the medium 18. We have found this pore size to produce optimum performance measured in terms of port loading.

The porous foam metal medium panel 18 fits into a perforate tray-shaped stainless-steel distribution member 26 having a flat panel portion 28 containing slot like openings 30 arranged in a uniform array of staggered columns over essentially the entire interior surface of the panel 28. The dimensions of the panel 18 and the tray 26 are such as to allow for some thermal expansion and contraction of the materials. The distribution tray 26 has a continuous lip 32 around all four sides the depth of which, in this embodiment, is equal to the thickness of the porous medium panel 18 so that the top surface of the medium panel 18 is flush with the top edge 34 of the lip 32 of the distribution tray 26 as shown in the sectional view of FIG. 3.

The combination further comprises a retainer member 20, made of a material such as stainless steel having a surrounding flange 22 adapted to overlie and mate with the flange 14 of the plenum box 12. In addition, the retainer 20 includes an integral raised rectangular bezel 24 that overlies the outer area of the medium panel 18 but leaves the majority of the surface area of the medium panel exposed as shown in FIG. 1.

As shown in the sectional view of FIG. 3, the top portion of the bezel 24 contactingly overlies and captures the top edge 34 of the distribution tray lip 32 as well as a narrow outer rectangular area of the medium panel 18 and the outer portion of the distribution tray bottom surface 26 rests flat against the innermost potion of the plenum box flange 14 such that the retainer 20, when its flange 22 is fastened by spot welding, staking, riveting or other suitable means to the flange 14 of the plenum box 12, tightly affixes the distribution plate bottom surface 26 to the flange 14 of the plenum box, thus, eliminating the need for conventional gasket material to seal the interface between the plenum box flange and the retainer member 20. Once the spot welding is done, the elements 12, 16, 18, 20, and 26 become a single unit.

By way of detail, the illustrative embodiment may produce a heat output on the order of 34,000 BTUs with a port loading of approximately 965 BTU/in$^2$ with an input fuel air mixture of 7.25 cubic feet per minute.

The plenum box is approximately 13 inches in length by 3 inches in width and 1.5 inches in height, excluding the additional height represented by the top structure including the distribution tray 26, the porous medium 18 and the retainer 20. An igniter 36 of conventional design is mounted on the plenum box with electrodes 38 extending out over the central exposed surface of the porous medium 18 to ignite the fuel air mixture as it passes up through the slots in the distribution tray 26 and the pores of the medium 18. An igniter with a supplemental gas tube between the electrodes may also be used. We have found that the fuel air mixture will not ignite without the porous medium; i.e., with only the perforate distribution tray, and will not produce the desired port loading without the combination of the distribution tray and the porous medium.

With respect to the details of the perforate distribution tray, we have found that the optimum performance is produced by an array of slot-shaped openings having a length of 0.238 inches and a width of 0.028 inches for an area of 0.00667 square inches per slot. In the illustrated embodiment there 382 slots in an overall perforated surface area of 35 square inches and the slots are arranged in staggered columns over the entire effective surface area of the tray, less the rectangular frame area covered by the bezel of the retainer plate 20. The slots need not be oriented exactly as shown but may be angled as desired. The aggregate area of the 382 slots of the array is about 7% of the total area of the flat distribution tray surface.

Figure 4:
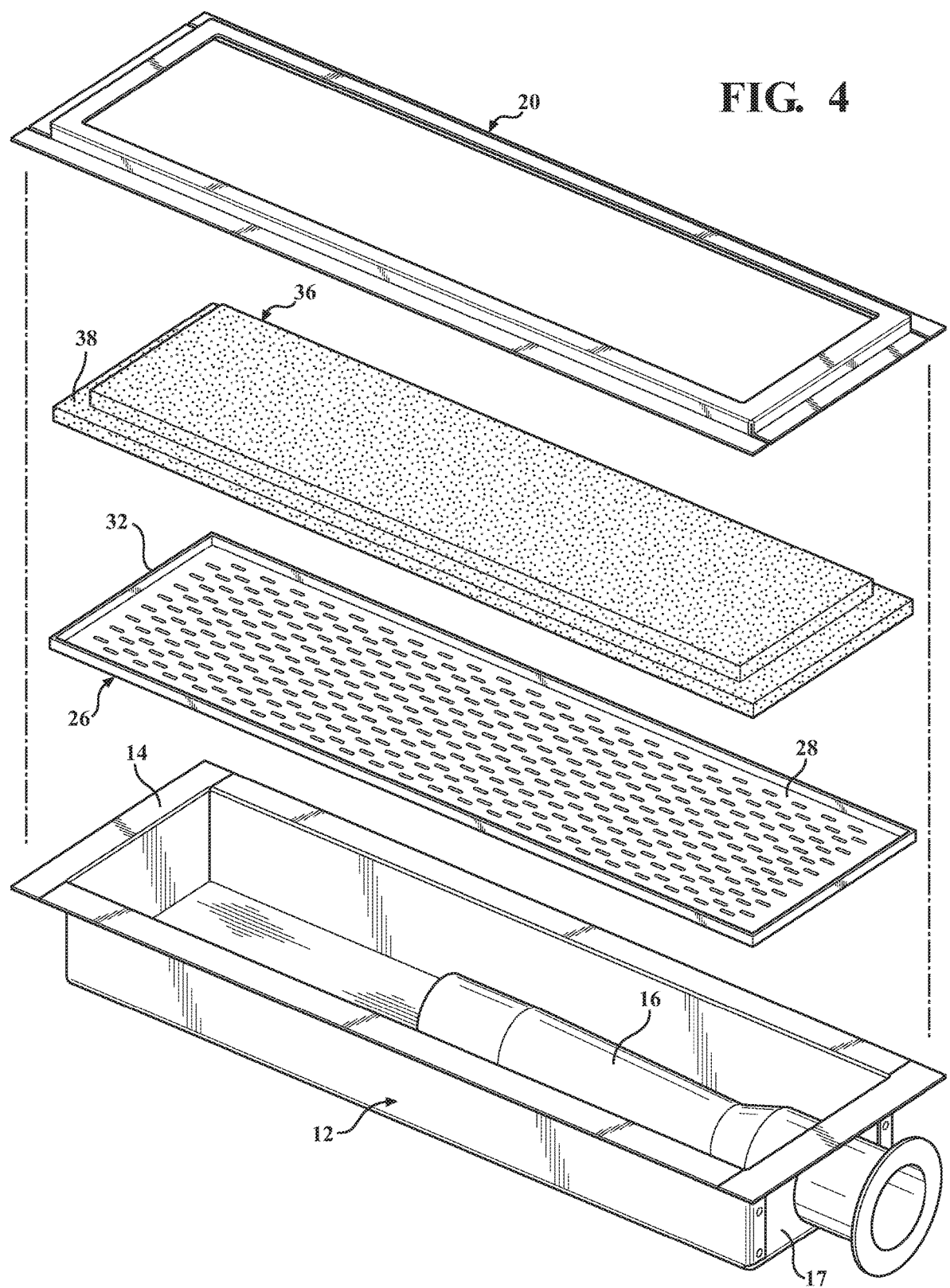
FIG. 4 is an exploded view of a burner using an alternative radiator medium configuration.
Figure 5:
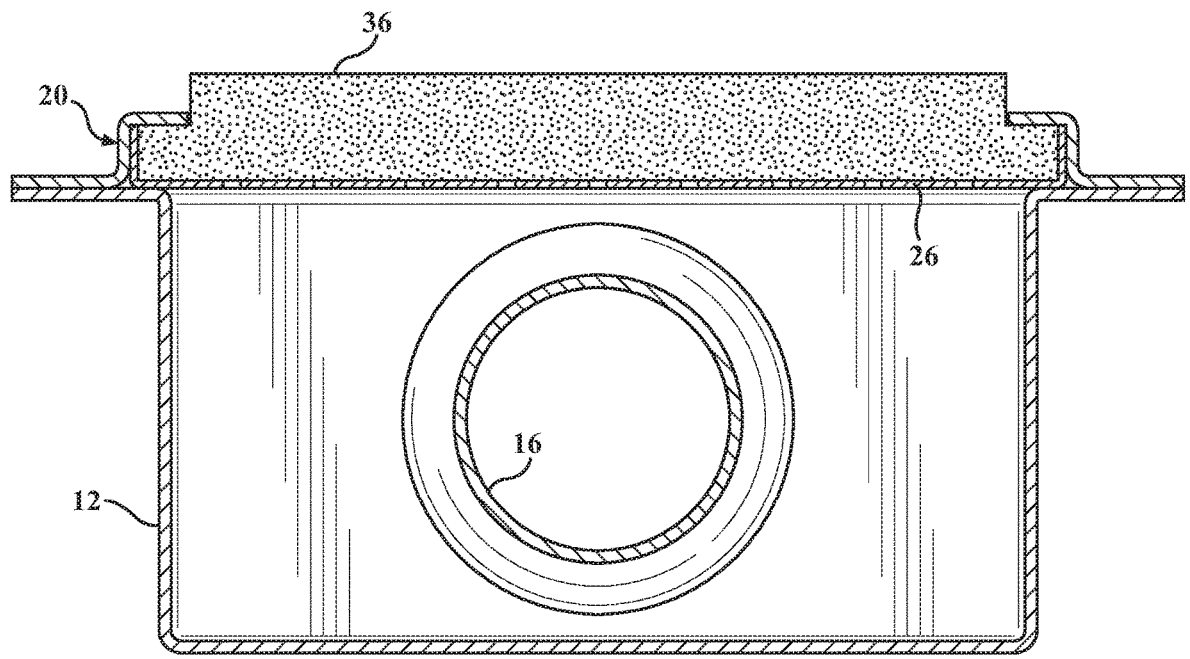
FIG. 5 is an end-on sectional view of the FIG. 4 burner.

A second, alternative embodiment is shown in FIGS. 4 and 5 to include the plenum box 12, input tube 16, distribution tray 26 and retainer from the embodiment of FIGS. 1-3. However, in this embodiment, the foam metal medium panel 36 is thicker than the panel 18 in the previous embodiment to allow for operation at higher inlet pressures while, at the same time, avoiding flame lift-off in operation. The panel 36 is formed with a flat surround 38 with a thickness that corresponds essentially to the height of the lip 32 on the distribution tray so that the retainer plate 20 clamps the tray 26 and the medium 36 onto the plenum box flange as in the embodiment of FIGS. 1-3.

INDUSTRIAL APPLICATION

Figure 6:
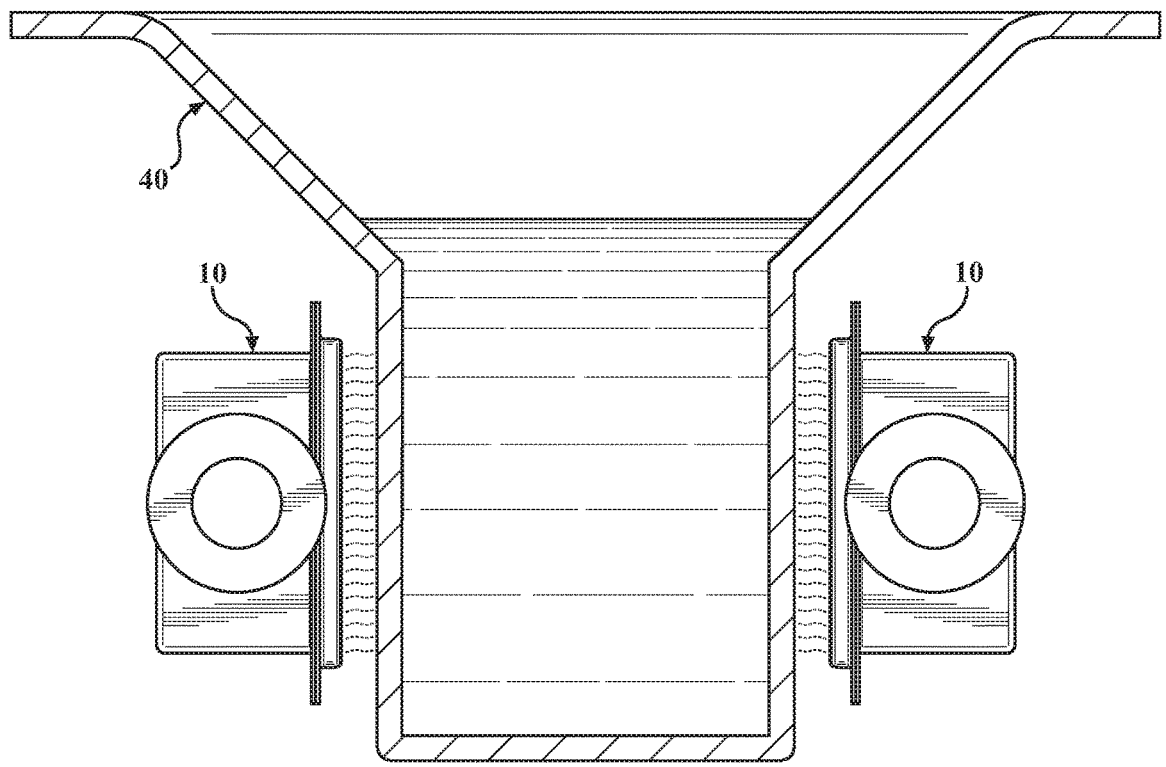
FIG. 6 shows how the burners are used in a cooking vessel application.

As shown in FIG. 6 the burner 10 is used in pairs in combination with an oil filled cooking vessel 40 which is used in the preparation of various "deep fried" food products in restaurants throughout the world. Two burners are used, one on each side of the metal vessel structure, both radiating toward the vessel structure in conventional fashion. The fuel air mixture is introduced under the above described pressure to each of the burners in the combination and ignited by means of igniters 36 as described above.

It will be understood that the metrics and configurations described above with respect to the disclosed embodiments are for illustrative purposes only and may vary according to the specific application. By way of example, the burner may be square or circular in configuration albeit rectangular burners unit shapes are the most commercially popular configuration.

10 burner
12 plenum box
14 flange
16 inlet tube
17 end panel
18 medium
20 retainer
22 flange
24 bezel
26 distribution tray
28 flat panel portion of tray 26
30 openings (slots)
32 lip
34 top edge
36 igniter
38 electrodes
40 vessel

What is claimed:

1. A powered, gas-fired infrared burner unit comprising:
   a plenum box for receiving a fuel/air mixture under pressure and having a top opening surrounded by an integral edge flange, said box having an inlet for said fuel/air mixture;
   a perforated distribution tray having a face and a surrounding lip and dimensioned to fit over the plenum box opening and onto the edge flange;
   a foam metal combustion medium in plate form fitted directly over and contactingly against the face of the distribution tray such that combustion of the fuel/air mixture takes place in said foam metal medium; and
   a retainer member having a bezel contactingly overlying the surface, the retainer member having a surrounding flange overlying and fastened to the plenum box flange to capture the distribution tray and medium, sealingly secure the plate and panel to the plenum box edge flange with the perforated distribution tray underlying the medium and a majority of the top surface of the medium exposed for radiation.

2. A gas-fired infrared burner and defined in claim 1 wherein the porous medium is characterized by an open cell foam metal structure with a pore size of 1,000 microns ±5%.

3. A gas-fired infrared burner as defined in claim 2 wherein the distribution tray surface within said lip is characterized by an array of spaced apart slotted openings uniformly distributed over substantially the entire overlying surface of the medium to produce, in combination with the medium, a port loading in the range of about 850 to 1,000 BTU/in$^2$.

4. A gas-fired infrared burner as defined in claim 3 wherein the aggregate area of the slotted openings is on the order of 7% of the overall area of the distribution tray.

5. A gas-fired infrared burner as defined in claim 1 wherein the composition of the media consists of a nickel, chromium, aluminum alloy foamed to produce an open cell structure throughout.

6. A gas-fired burner as defined in claim 1 with a port loading of approximately 965 BTU/in$^2$.

7. A gas-fired burner as defined in claim 1 further including an igniter with electrodes providing a spark gap disposed over and in spaced relation to said medium.

8. A gas-fired burner as defined in claim 1 wherein said retainer member includes a rectangular edge flange and, integrally with said edge flange, a raised four-sided bezel configured to engage the top edge of the distribution member lip to clamp the distribution member and medium to the plenum box flange.

9. A gas-fired burner as defined in claim 1 wherein the plenum box, medium, and distribution plate are substantially rectangular.

10. A gas-fired burner as defined in claim 9 configured to produce an output of approximately 34,000 BTU.

\* \* \* \* \*